(12) United States Patent
Kim

(10) Patent No.: US 11,419,709 B2
(45) Date of Patent: Aug. 23, 2022

(54) STORAGE POUCH FOR TEETH TRANSPARENT STRAIGHTENER

(71) Applicant: Tae Weon Kim, Seoul (KR)

(72) Inventor: Tae Weon Kim, Seoul (KR)

( * ) Notice: Subject to any disclaimer, the term of this patent is extended or adjusted under 35 U.S.C. 154(b) by 26 days.

(21) Appl. No.: 17/090,934

(22) Filed: Nov. 6, 2020

(65) Prior Publication Data

US 2021/0137663 A1 May 13, 2021

(30) Foreign Application Priority Data

Nov. 8, 2019 (KR) .......................... 10-2019-0142808

(51) Int. Cl.
*A61C 19/02* (2006.01)
*A61C 19/04* (2006.01)

(52) U.S. Cl.
CPC .............. *A61C 19/02* (2013.01); *A61C 19/04* (2013.01); *A61C 2202/00* (2013.01)

(58) Field of Classification Search
CPC ..... A61C 19/04; A61C 19/02; A61C 2202/00; A61C 7/08
USPC ......... 206/210, 368, 63.5, 459.1, 459.5, 369
See application file for complete search history.

(56) References Cited

U.S. PATENT DOCUMENTS

| 5,330,056 A * | 7/1994 | de la Rocha | B65D 5/5088 206/229 |
| 6,082,534 A * | 7/2000 | Dotson | B65D 75/5805 206/812 |
| 6,383,504 B1 * | 5/2002 | Dotson | G02C 13/008 424/404 |
| 7,648,360 B2 * | 1/2010 | Kuo | A61C 7/08 206/63.5 |
| 8,181,786 B1 * | 5/2012 | Alas | B65D 77/003 206/570 |
| 8,220,624 B2 * | 7/2012 | Gauger | B65D 75/54 206/581 |
| 10,772,714 B1 * | 9/2020 | Chapman | H04W 4/029 |
| 2004/0244805 A1 * | 12/2004 | Cook | B65D 43/164 128/859 |
| 2005/0003319 A1 * | 1/2005 | Kuo | A61C 7/08 206/63.5 |

(Continued)

FOREIGN PATENT DOCUMENTS

KR 20140004746 U 8/2014

*Primary Examiner* — Chun Hoi Cheung
(74) *Attorney, Agent, or Firm* — Bayramoglu Law Offices LLC

(57) ABSTRACT

A storage pouch for a teeth transparent straightener is provided. The storage pouch includes: a pouch body having a plurality of packaging materials having a zipper for opening and closing is configured to insert and withdraw the plurality of transparent straighteners individually at each entrance, and the pouch body having a perforated line in each of a plurality of adjacent packaging materials. An interior material inserted and placed within each of the plurality of packaging materials to carry out a position fixing of an upper dentition straightening frame and a lower dentition straightening frame composing the teeth transparent straightener. A straightening confirmation unit having a mirror facet consisting of mirror coating layers and having an expected image printed on the mirror facet to match an orthodontic teeth of a patient based on orthodontic teeth data of the patient to compare.

5 Claims, 4 Drawing Sheets

(56) References Cited

U.S. PATENT DOCUMENTS

| | | | | |
|---|---|---|---|---|
| 2007/0114139 A1* | 5/2007 | Moore | ............ | A61C 19/02 |
| | | | | 206/63.5 |
| 2010/0181214 A1* | 7/2010 | Brown | ............ | A61C 19/02 |
| | | | | 206/557 |
| 2013/0180870 A1* | 7/2013 | Nihei | ............ | A61C 19/02 |
| | | | | 206/63.5 |
| 2014/0263500 A1* | 9/2014 | Brooks | ............ | A61C 7/00 |
| | | | | 224/269 |
| 2015/0136624 A1* | 5/2015 | Konig | ............ | A46B 15/0091 |
| | | | | 206/63.5 |
| 2017/0020642 A1* | 1/2017 | Mah | ............ | A61C 19/02 |
| 2019/0201177 A1* | 7/2019 | Beckerman | ............ | A45C 11/00 |
| 2020/0022483 A1* | 1/2020 | Pierce | ............ | A61C 19/02 |
| 2020/0390523 A1* | 12/2020 | Sato | ............ | A61C 7/08 |

* cited by examiner

STORAGE POUCH FOR TEETH TRANSPARENT STRAIGHTENER

CROSS-REFERENCE TO RELATED APPLICATION

This application claims priority to and the benefit of Korean Patent Application No. 10-2019-0142808, filed on Nov. 8, 2019, the disclosure of which is incorporated herein by reference in its entirety.

TECHNICAL FIELD

The present invention relates to a storage pouch for teeth transparent straightener, and more particularly, to a storage pouch for teeth transparent straightener for individually and conveniently storing and handling a plurality of transparent straighteners composed as a set according to an orthodontic schedule, and for reminding a patient of motivation for teeth straightening from time to time, thus encouraging the patient to wear the transparent straighteners for a long time.

BACKGROUND

In general, methods for orthodontics can be classified into metal orthodontics using an orthodontic device made of a metal bracket, lingual orthodontics applying an orthodontic device inside the teeth, and transparent orthodontics straightening teeth by wearing a transparent teeth straightener made of a transparent material to the teeth.

The transparent orthodontic method is in the spotlight compared to other orthodontic methods since in the transparent orthodontic method a transparent straightener made of a transparent material is covered on the teeth like a mouthpiece and thus detachable as well as non-visible from the outside, showing excellent wearability.

In other words, in order to artificially move teeth in need of correction to the ideal teeth arrangement the transparent orthodontic method using a transparent straightener revises teeth by producing a transparent straightener calibrated based on the data of the orthodontic teeth that have been moved within the range of clinical movement, and then wearing the transparent straightener to the teeth like a mouthpiece to provide orthodontic force.

Since such transparent straightener may strain the teeth and damage the teeth nerve if the movement range is too large, the movement range is limited to one or two millimeters per a movement and a plurality of transparent straighteners are produced as a set to gradually move the teeth in order to move the teeth to the final ideal teeth arrangement.

Patients who receive transparent orthodontics for misaligned dentition are provided with a plurality of sets of transparent straighteners and should sequentially wear them during the wearing period according to the wearing order.

(Patent Document 1) Korean Utility Patent Laid-Open Publication No. 20-2014-0004746 (2014.08.22)

A case for safely accommodating transparent straighteners composed of a plurality of sets according to the order of wearing, and receiving and storing the transparent straighteners by separating them according to the wearing order is disclosed in the patent document 1.

However, such case has the advantage of being able to manage the transparent straighteners without misunderstanding confusedly the order of wearing, but it is bulky and acts as a main cause for increasing the production cost.

In addition, the fatal disadvantage of orthodontics using the transparent straighteners is that patients should wear the transparent straighteners for a sufficiently long period of 17 to 20 hours a day to enhance the orthodontic effect, but motivation for orthodontics decreases over time, and wearing time of the transparent straighteners is gradually reduced, thereby mainly causing the orthodontic effect to reduce.

SUMMARY

Accordingly, the present invention is directed to providing a storage pouch for teeth transparent straightener for individually and conveniently storing and handling a plurality of transparent straighteners composed as a set according to an orthodontic schedule, and for reminding a patient of motivation for teeth straightening from time to time, thus encouraging the patient to wear the transparent straighteners for a long time.

The technical problems to be achieved in the present invention are not limited to the technical problems mentioned above, and other technical problems not mentioned will be clearly understood by those of ordinary still in the art from the following description.

An exemplary embodiment of the present invention provides a storage pouch for teeth transparent straightener for individually and internally accommodating and storing a plurality of transparent straighteners composed as a set according to an orthodontic schedule, including: a pouch body having a plurality of packaging materials having at each entrance a zipper for opening and closing configured to insert and withdraw the plurality of transparent straighteners individually, and having a perforated line in each of a plurality of adjacent packaging materials; an interior material inserted and placed within each of the plurality of packaging materials to carry out position fixing of an upper dentition straightening frame and a lower dentition straightening frame composing the transparent straightener; and a straightening confirmation unit having a mirror facet consisting of mirror coating layers and having an expected image printed on the mirror facet to match a patient's orthodontic teeth based on the patient's orthodontic teeth data to compare and confirm the patient's real teeth projected on the mirror facet and expected image printed on the mirror facet.

In this case, the interior material includes an upper plate having an upper member on one side so that the upper dentition straightening frame is correspondingly inserted into a groove of the upper member, a lower plate having a lower member on one side so that the lower dentition straightening frame is correspondingly inserted into a groove of the lower member, and a connecting plate that connects the upper and lower plates to be foldable provided that the upper member and the lower member face each other.

In this case, a slit groove is formed at any one of a connecting part where one side end of the upper plate and an upper end of the connecting plate are connected each other and a connecting part where one side end of the lower plate and a lower end of the connecting part are connected each other.

In this case, one end of the interior material is fixed to one of the upper and lower plates, and the other end is supported in contact with the other plate, the interior material having a support bar of a predetermined length to maintain a constant distance between the upper and lower plates.

In this case, the expected image may be an outline in the form of a line showing the dentition of the transparent straightener for which the upper dentition straightening frame and the lower dentition straightening frame are combined, created based on image data reflecting dentition movement state per straightening steps, or an actual picture of the transparent straightener for which the upper dentition straightening frame and the lower dentition straightening frame are combined.

According to a preferred embodiment of the present invention as described above there are following effects.

According to an exemplary embodiment of the present invention, it is possible to prevent damage or deformation of transparent straighteners due to external force and increase convenience and handling in use since a plurality of transparent straighteners composed as a set according to an orthodontic schedule may be stored individually in a pouch body having a plurality of packaging materials as well as an interior material and the transparent straighteners stored in the packaging materials may be withdrawn individually according to each orthodontic step.

Since patients can compare an image data printed on a mirror facet of the packaging material and his/her dentition reflected on the mirror facet each other in the process of withdrawing and replacing the transparent straighteners stored in a plurality of packaging materials to the outside according to orthodontic steps they can directly see their orthodontic state which may remind the patients of motivation for teeth straightening from time to time, thereby evoking the patients the need to wear the transparent straighteners for a long time to enhance the orthodontic effect.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which.

DESCRIPTION OF SYMBOLS

Figure 1:
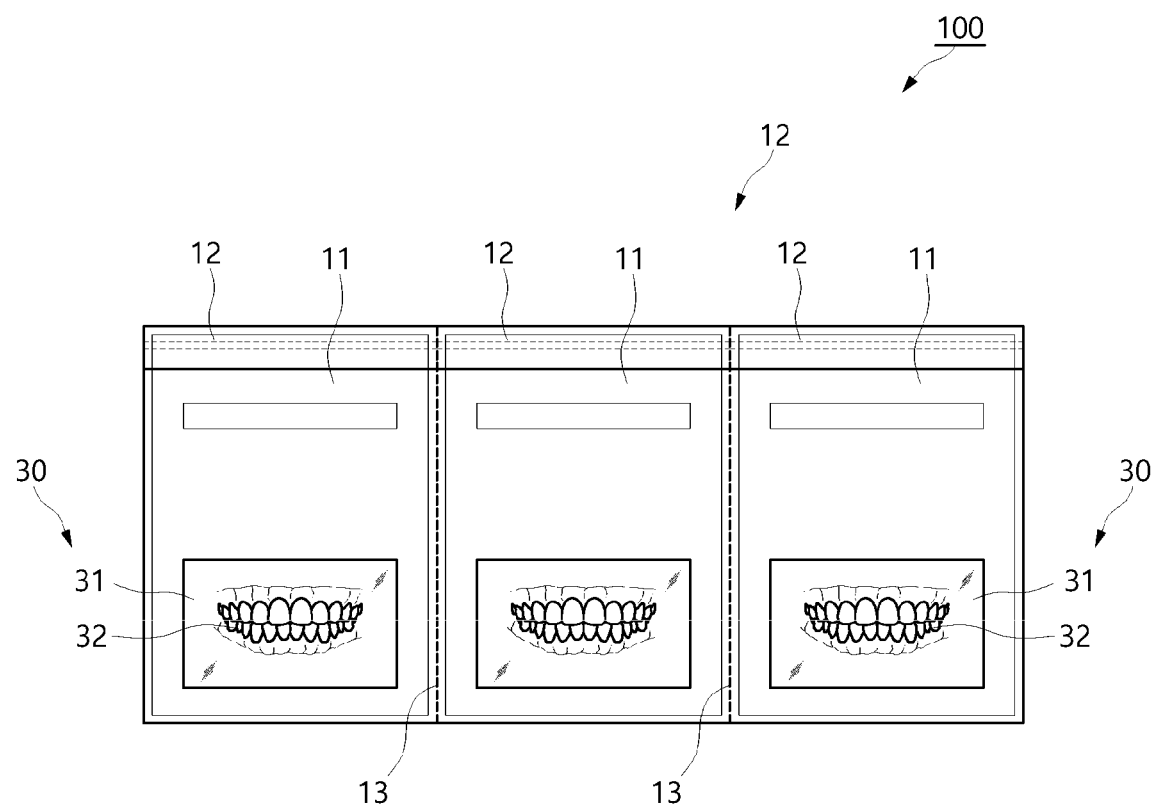
FIG. 1 is a full perspective view illustrating storage pouches for teeth transparent straightener according to an exemplary embodiment of the present invention.

1: upper dentition straightening frame
2: lower dentition straightening frame
3: transparent straightener
10: pouch body
11: packaging material
12: zipper lock
13: perforated line
20: interior material
21: upper plate
22: lower plate
23: connecting plate
24, 25: upper case, lower case
30: straightening confirming unit
31: mirror facet
32: expected image

DETAILED DESCRIPTION OF THE EMBODIMENTS

Hereinafter, with reference to the accompanying drawings preferred embodiments of the present invention will be described in detail so that those of ordinary skill in the art can readily implement the present invention. However, in describing in detail the structural principle for preferred embodiments of the present invention when it is determined that a detailed description of a related known function or configuration may unnecessarily obscure the subject matter of the present invention, the detailed description thereof will be omitted.

In addition, the same reference numerals are used for parts having similar functions and actions throughout the drawings.

In addition, throughout the specification, when a part is said to be 'connected' to another part, this includes not only 'directly connected' but also 'indirectly connected' with another element in the middle. Unless explicitly described to the contrary, the word "comprise" and variations such as "comprises" or comprising will be understood to imply the inclusion of stated elements but not the exclusion of any other elements.

Figure 2:
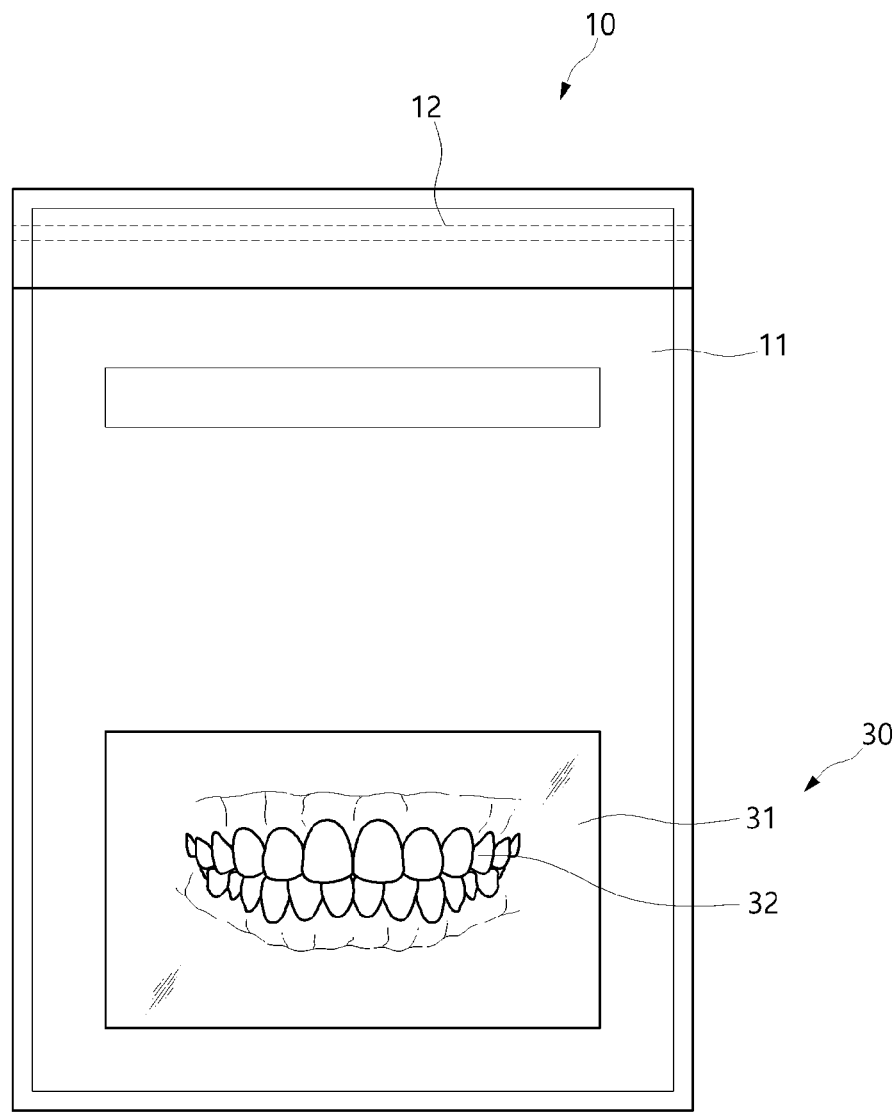
FIG. 2 is a detail view illustrating a packaging material individually separated from a storage pouch for teeth transparent straightener according to an exemplary embodiment of the present invention.
Figure 3:
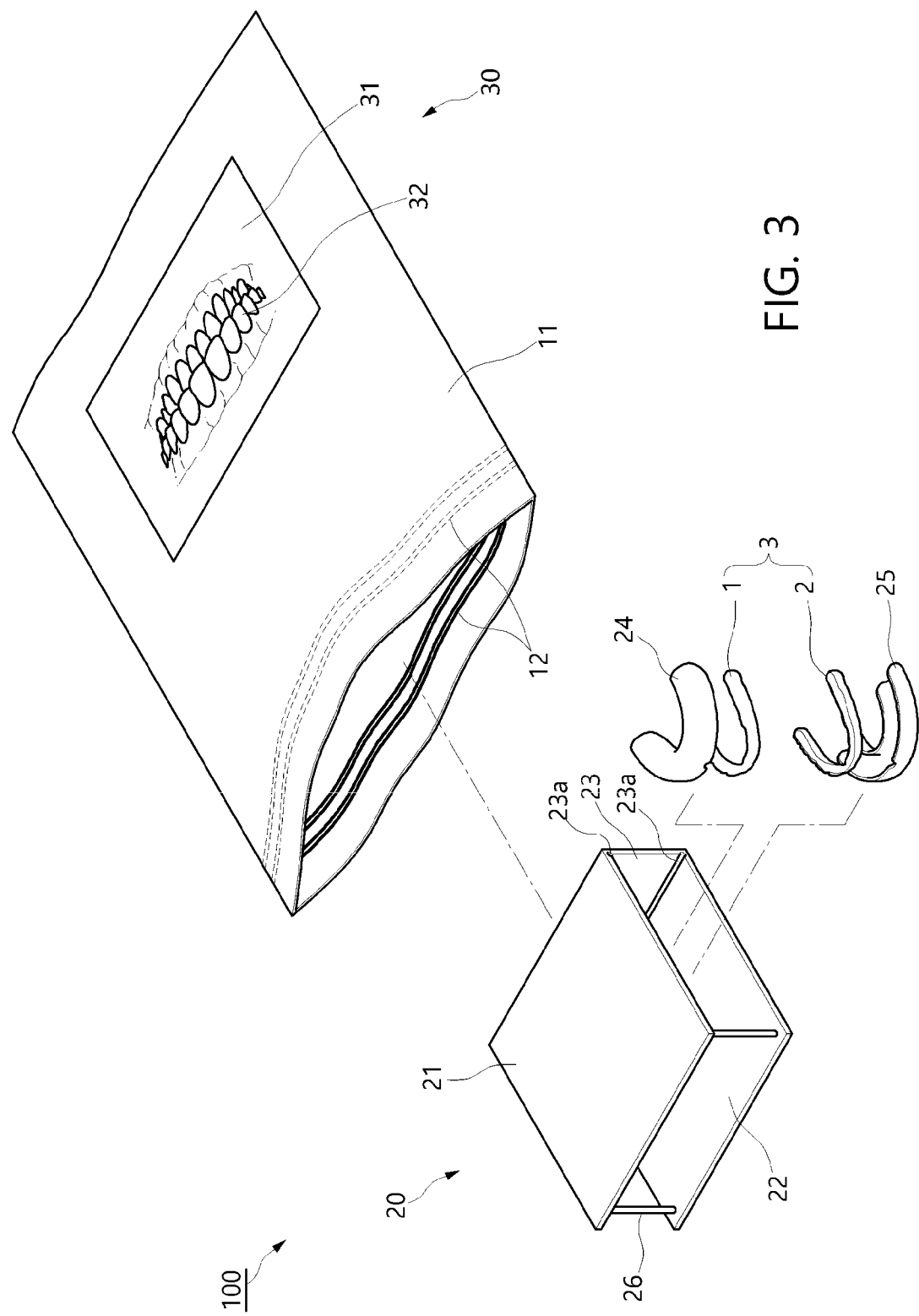
FIG. 3 is a exploded perspective view illustrating a packaging material and an interior material provided in a storage pouch for teeth transparent straightener according to an exemplary embodiment of the present invention.

A storage pouch for teeth transparent straightener 100 according to an embodiment of the present invention may include a pouch body 10, an interior material 20 and a straightening confirming unit 30 so as to check the orthodontic state of a patent while individually and internally accommodating and storing a plurality of transparent straighteners 3 composed as a set according to an orthodontic schedule in order to straighten the patient' misaligned dentition as shown in FIGS. 1 to 3.

The pouch body 10 includes a plurality of packaging materials 11 having at each entrance a zipper 12 for opening and closing configured to insert and withdraw the plurality of transparent straighteners 3 individually as shown FIG. 1.

And the pouch body 10 has a perforated line 13 in each of a plurality of adjacent packaging materials 11 so that the packaging materials may be separated along the perforated line and the transparent straighteners 3 stored therein may be withdrawn and used.

Here, the transparent straightener 3 basically composed of an upper dentition straightening frame 1 and a lower dentition straightening frame 2 is produced according to a number of steps since there is a limit on movement of teeth (less than 1 mm). As for the steps, when a period of wearing a transparent straightener in step 1 elapses, the process of replacing and wearing a transparent straightener in step 2 is repeated until the last step to revise misaligned teeth into the set teeth based on orthodontic teeth data.

In addition, same level of transparent straighteners can be worn sequentially from low to high hardness in order to increase orthodontic compliance of patients' teeth using transparent straighteners, and in this case a plurality of transparent straighteners are required even at the same step.

Here, the classification of the hardness may be determined according to the thickness of the transparent straightener, wherein the thinner the thickness of the transparent straightener is, the softer it becomes; and the thicker the thickness of the transparent straightener is, the harder it becomes.

For example, if a complete set of transparent straighteners consists of three steps and requires wearing two kinds of transparent straighteners of different hardness such as soft and hard, the total number of transparent straighteners 3 required can be six.

The number of packaging materials provided in the pouch body for storing the transparent straighteners is illustrated and described as consisting of three, but is not limited thereto and may be increased.

Figure 4:
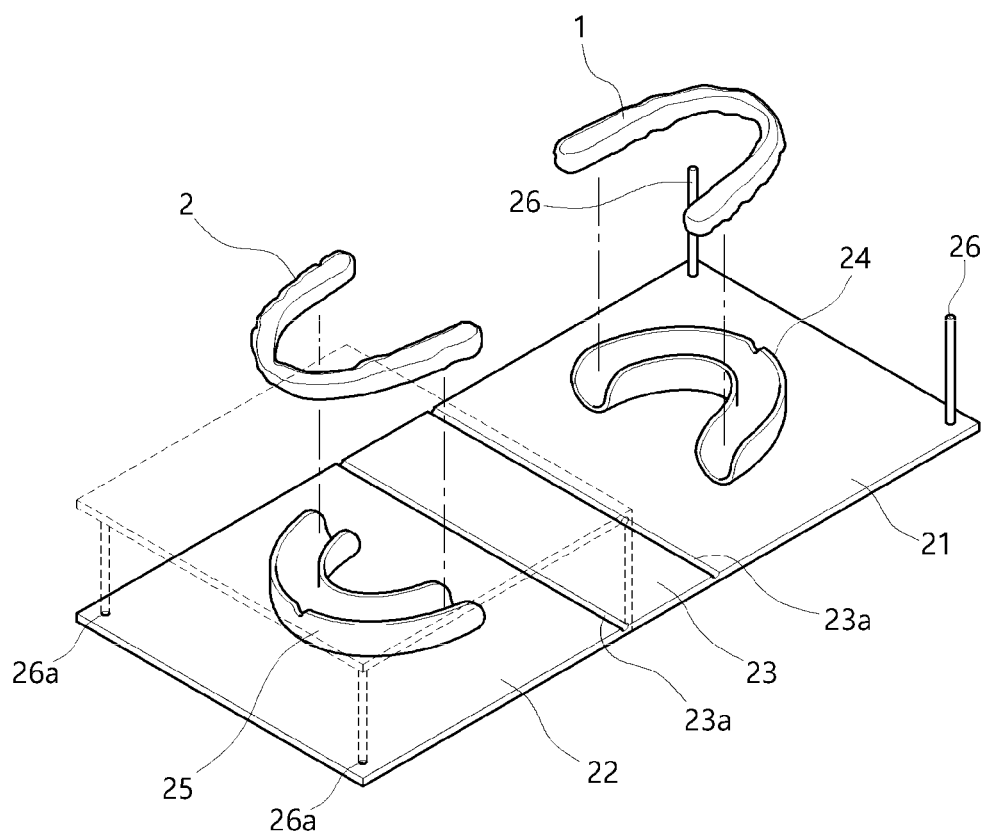
FIG. 4 is a usage state view of an interior material provided in a storage pouch for teeth transparent straightener according to an exemplary embodiment of the present invention.

As shown FIG. 3 and FIG. 4, the interior material 20 is intended to be inserted and placed within each of the plurality of packaging materials 11 to carry out position fixing of the upper and lower dentition straightening frames 1 and 2 composing the transparent straightener 3 to prevent damage or deformation of the upper and lower dentition straightening frames 1 and 2 due to external force.

Such interior material 20 includes an upper plate 21 having an upper case 24 on one side so that the upper dentition straightening frame 1 is correspondingly inserted into a groove of the upper case 24, a lower plate 22 having a lower case 25 on one side so that the lower dentition straightening frame 2 is correspondingly inserted into a groove of the lower case 25, and a connecting plate 23 that connects the upper and lower plates 21 and 22 to be foldable provided that the upper case 24 and the lower case 25 face each other.

In this case, preferably, a slit groove 23a is formed at each of a connecting part where one side end of the upper plate 21 and an upper end of the connecting plate 23 are connected each other and a connecting part where one side end of the lower plate 22 and a lower end of the connecting part 23 are connected each other so that the upper and lower plates 21 and 22 can be folded horizontally with respect to the vertical connecting plate 23.

In addition, the interior material 20 may have a support bar 26 of a predetermined length having one end of the support bar fixed to one of the upper and lower plates, and the other end substantially supported in contact with the other plate.

By maintaining a uniform distance between the upper plate and the lower plate by such support bar 26, it is possible to prevent deformation or damage to the end of the upper dentition straightening frame 1 inserted and placed in the upper case 24 and the end of the lower dentition straightening frame 2 inserted and placed in the lower case 25 due to excessive folding of both ends as the space between the upper plate 21 and the lower plate 22 is narrowed by an external force transmitted to the packaging material.

In addition, preferably, the other end of the support bar 26 having one end fixedly installed on one side of the upper plate is inserted correspondingly to the fixing groove 26a recessed in one side of the lower plate, thereby minimizing the movement of the support bar caused by an external force.

Such support bar 26 is illustrated and described as being provided in a pair on both sides of one end of the upper plate, but is not limited thereto and may be provided with one support bar or more.

In addition, the upper and lower cases 24 and 25 fixedly installed on each side of the upper and lower plates 21 and 22 are illustrated and described as being fixed by inserting and placing one upper and lower dentition straightening frame, respectively. But it is not limited thereto and there may be provided a plurality of upper and lower cases for insertion and placement of upper and lower dentition straightening frames with different hardness.

Such upper and lower cases 24 and 25 may be made of paper or plastic materials or made of synthetic resin materials such as sponges, Styrofoam, rubber, etc. that have elastic and buffering forces to absorb external shocks while preventing damage or deformation of transparent straighteners caused by external shocks.

Accordingly, the upper dentition straightening frame 1 and the lower dentition straightening frame 2 of the transparent straightener may be correspondingly inserted into and fixed to the upper and lower cases 24 and 25, respectively, and in this state, the interior material 20, in which the upper and lower plates 21 and 22 are folded at substantially right angles to be arranged in a horizontal state parallel to each other with respect to the vertical connecting plate, may be inserted into and temporarily stored in the inside of the packaging material 11 of which the entrance is open.

And, in the interior material 20 by bending the upper plate outward with respect to the lower plate placed on the bottom surface, spreading it so as to contact the bottom surface together with the connecting plate 23, and then exposing upwards the upper and lower dentition straightening frames 1 and 2 respectively inserted and placed into the upper and lower cases, the upper and lower dentition straightening frames may be conveniently and easily separated from the upper and lower cases according to orthodontic steps or reinserted and stored temporarily after straightening.

As shown in FIG. 1 and FIG. 2, the straightening confirming unit 30 may have a mirror facet 31 consisting of mirror coating layers on each side of a plurality of packaging materials composing the pouch body so that a counterpart can be seen on the mirror facet.

Such mirror facet 31 may have an expected image 32 printed on the mirror facet to match a patient's orthodontic teeth based on the patient's orthodontic teeth data.

The expected images 32 printed on each mirror facet of the plurality of packaging materials 11 composing the pouch body 10 are printed differently based on image data reflecting dentition movement state per straightening steps.

That is, the expected image 32 may be an outline in the form of a line showing the dentition of the transparent straightener for which the upper dentition straightening frame and the lower dentition straightening frame are combined, created by a 3D printer based on image data reflecting dentition movement state per straightening steps, or an actual picture of the transparent straightener for which the upper dentition straightening frame and the lower dentition straightening frame are combined.

Product information such as an identification code indicating a orthodontic step or a hardness classification of the transparent straightener 3 may be printed on the outer surface of the packaging material 11 along with the mirror facet.

Since in each step of straightening teeth using the transparent straightener patients can compare an image data printed on a mirror facet of the packaging material and his/her dentition reflected on the mirror facet each other in the process of withdrawing and replacing the transparent straighteners stored in a plurality of packaging materials to the outside according to orthodontic steps they can directly see their orthodontic state.

In addition, since the patent can be reminded of motivation for teeth straightening in the process of checking the orthodontic state, it is possible to evoke the patient that the orthodontics will be done correctly and effectively by wearing transparent straighteners for a long time, and possible to increase the patient's satisfaction with the orthodontics.

It will be apparent to those skilled in the art that the present invention is not limited to the above-described embodiments and the accompanying drawings and various substitutions, modifications and changes are possible within a range which does not depart from the technical concept of the present invention.

What is claimed is:

1. A storage pouch for a teeth transparent straightener for individually and internally accommodating and storing a plurality of transparent straighteners composed as a set according to an orthodontic schedule, comprising:
    a pouch body, wherein the pouch body has a plurality of packaging materials and has a zipper for opening and closing, the zipper is configured to insert and withdraw the plurality of transparent straighteners individually at each entrance, and the pouch body has a perforated line in each of a plurality of adjacent packaging materials;
    an interior material, wherein the interior material is inserted and placed within each of the plurality of packaging materials to carry out a position fixing of an upper dentition straightening frame and a lower dentition straightening frame composing the teeth transparent straightener; and
    a straightening confirmation unit, wherein the straightening confirmation unit has a mirror facet consisting of mirror coating layers and has an expected image printed on the mirror facet to match an orthodontic teeth of a patient based on orthodontic teeth data of the patient to compare and confirm a real teeth of the patient projected on the mirror facet and the expected image printed on the mirror facet.

2. The storage pouch of claim 1, wherein the interior material comprises
    an upper plate, having an upper member on a side of the upper plate, wherein the upper dentition straightening frame is correspondingly inserted and placed into a groove of the upper member,
    a lower plate, having a lower member on a side of the lower plate, wherein the lower dentition straightening frame is correspondingly inserted and placed into a groove of the lower member, and
    a connecting plate, wherein the connecting plate connects the upper plate and the lower plate to be foldable when the upper member and the lower member faces each other.

3. The storage pouch of claim 2,
    wherein a slit groove is formed at one of a first connecting part and a second connecting part,
    wherein one side end of the upper plate and an upper end of the first connecting plate are connected to each other, and one side end of the lower plate and a lower end of the second connecting part are connected to each other.

4. The storage pouch of claim 2,
    wherein a first end of the interior material is fixed to one of the upper plate and the lower plate, and a second end of the interior material is supported in contact with the other one of the upper plate and the lower plate, and
    the interior material has a support bar of a predetermined length to maintain a constant distance between the upper plate and the lower plate.

5. The storage pouch of claim 1,
    wherein the expected image is an outline in a form of a line showing a dentition of the teeth transparent straightener,
    the expected image is created based on image data reflecting a dentition movement state per straightening steps, or an actual picture of the teeth transparent straightener,
    wherein for reflecting the dentition movement state per straightening steps, or the actual picture of the teeth transparent straightener, the upper dentition straightening frame and the lower dentition straightening frame are combined.

* * * * *